(12) United States Patent
Taya

(10) Patent No.: US 9,263,847 B2
(45) Date of Patent: Feb. 16, 2016

(54) LIGHT DELIVERY COMPONENT AND LASER SYSTEM EMPLOYING SAME

(71) Applicant: FUJIKURA LTD., Tokyo (JP)

(72) Inventor: Hiroyuki Taya, Sakura (JP)

(73) Assignee: FUJIKURA LTD., Tokyo (JP)

( * ) Notice: Subject to any disclaimer, the term of this patent is extended or adjusted under 35 U.S.C. 154(b) by 217 days.

(21) Appl. No.: 14/032,372

(22) Filed: Sep. 20, 2013

(65) Prior Publication Data

US 2014/0016656 A1 Jan. 16, 2014

Related U.S. Application Data

(63) Continuation of application No. PCT/JP2012/050003, filed on Jan. 4, 2012.

(30) Foreign Application Priority Data

Mar. 31, 2011 (JP) ................. 2011-081108

(51) Int. Cl.
*G02B 6/00* (2006.01)
*H01S 3/067* (2006.01)
*H01S 3/04* (2006.01)
*H01S 3/094* (2006.01)
*H01S 3/0941* (2006.01)
*G02B 6/28* (2006.01)

(52) U.S. Cl.
CPC ............. *H01S 3/067* (2013.01); *H01S 3/06704* (2013.01); *H01S 3/06754* (2013.01); *G02B 6/2804* (2013.01); *H01S 3/0405* (2013.01); *H01S 3/0675* (2013.01); *H01S 3/09415* (2013.01); *H01S 3/094011* (2013.01)

(58) Field of Classification Search
None
See application file for complete search history.

(56) References Cited

U.S. PATENT DOCUMENTS

| 7,400,808 | B2 | 7/2008 | Seo et al. |
| 7,809,236 | B2 | 10/2010 | Muendel |
| 2007/0217738 | A1 * | 9/2007 | Anderegg et al. ............... 385/29 |

(Continued)

FOREIGN PATENT DOCUMENTS

| JP | 2006-114769 A | * 4/2006 | ............. H01S 3/042 |
| JP | 2007-271786 A | 10/2007 | |

(Continued)

OTHER PUBLICATIONS

English translation of written opinion for PCT/JP2012/050003, dated Feb. 7, 2012.*

(Continued)

*Primary Examiner* — Mike Stahl
(74) *Attorney, Agent, or Firm* — Westerman, Hattori, Daniels & Adrian, LLP

(57) ABSTRACT

A light delivery component includes a delivery fiber configured to include a core and a clad; and a heat radiating member, wherein the delivery fiber is configured to include a first light emitting unit connected to a first heat radiating member which is a portion of the heat radiating member and a second light emitting unit connected to a second heat radiating member which is another portion of the heat radiating member, and at least the second light emitting unit is bent, and wherein the first light emitting unit is installed closer to a light incidence end of the delivery fiber than the second light emitting unit, and a bending radius of the first light emitting unit is set to be larger than that of the second light emitting unit.

11 Claims, 4 Drawing Sheets

(56) References Cited

U.S. PATENT DOCUMENTS

| | | | |
|---|---|---|---|
| 2009/0074362 A1 | 3/2009 | Oba | |
| 2009/0161701 A1 | 6/2009 | Furuya et al. | |
| 2009/0190884 A1 | 7/2009 | Shimotsu | |
| 2009/0257242 A1 | 10/2009 | Wendman | |
| 2009/0279017 A1* | 11/2009 | Furuya et al. | 349/61 |
| 2009/0296746 A1* | 12/2009 | Heaton et al. | 372/6 |
| 2010/0247055 A1 | 9/2010 | Arashitani et al. | |
| 2011/0310469 A1 | 12/2011 | Nagayasu | |

FOREIGN PATENT DOCUMENTS

| | | |
|---|---|---|
| JP | 2008-244483 A | 10/2008 |
| JP | 2008-310277 A | 12/2008 |
| JP | 2009-115918 A | 5/2009 |
| JP | 2009-175506 A | 8/2009 |
| JP | 2010-002608 A | 1/2010 |
| JP | 2010-181574 A | 8/2010 |
| JP | 2010-232373 A | 10/2010 |
| JP | 2010-239037 A | 10/2010 |
| JP | 2010-239038 A | 10/2010 |
| WO | 2004/066007 A1 | 8/2004 |
| WO | 2007/066641 A1 | 6/2007 |
| WO | 2010/103764 A1 | 9/2010 |

OTHER PUBLICATIONS

International Search Report for PCT/JP2012/050003, Mailing Date of Feb. 7, 2012.
Japanese Office Action dated Sep. 24, 2014, issued in corresponding Japanese Application No. 2011-081108 (4 pages).
Notice of Allowance dated May 19, 2015, issued in counterpart JP application No. 2011-081108 (3 pages).

\* cited by examiner

LIGHT DELIVERY COMPONENT AND LASER SYSTEM EMPLOYING SAME

CROSS-REFERENCE TO RELATED APPLICATION

This application is a continuation of PCT International Application No. PCT/JP2012/050003, filed on Jan. 4, 2012, and claims the benefit of Japanese Patent Application No. 2011-081108, filed on Mar. 31, 2011, the entire contents of which are incorporated herein by reference.

TECHNICAL FIELD

The present invention relates to a light delivery component capable of preventing damage caused by heat and a laser system employing the light delivery component.

BACKGROUND ART

A fiber laser system is used in the fields of processing machines, medical instruments, measurement apparatuses, and the like. The fiber laser system emits light amplified by an amplification optical fiber. In some cases, in the fiber laser system, signal light amplified by the amplification optical fiber constructed with a double-clad fiber is emitted from a core of the amplification optical fiber. The amplified signal light is incident on a core of a delivery fiber constructed with a single-clad fiber connected to the amplification optical fiber. Next, the light is allowed to propagate through the delivery fiber to a desired site to be emitted.

However, the light emitted from the amplification optical fiber may include surplus pumping light emitted from the clad besides the signal light emitted from the core. As described above, in the case in which the delivery fiber is connected to the amplification optical fiber, the surplus pumping light is incident on the clad of the delivery fiber. In addition, in some cases, due to mismatch in mode field diameter between the signal light propagating through the core of the amplification optical fiber and the signal light propagating through the core of the delivery fiber or due to deviation in axis, deviation in angle, or the like in the connection of the amplification optical fiber to the delivery fiber, a portion of the signal light emitted from the amplification optical fiber may be incident on the clad of the delivery fiber.

The light incident on the clad of the delivery fiber is absorbed by the cover layer of the delivery fiber, so that a problem that the cover layer is burned out may occur. Therefore, it is preferable that the light incident on the clad of the delivery fiber is appropriately emitted.

Patent Document 1 listed below discloses a fusion splicing structure of an optical fiber emitting light incident on a clad. In the fusion splicing structure, a double-clad fiber and a single-clad fiber are connected to each other in a linear shape, and at least a fusion point of the single-clad fiber is covered with a block having high thermal conductivity. Therefore, even in the case in which light is incident from the double-clad fiber on the clad of the single-clad fiber and heat is released due to the emission of the light, the heat is absorbed by the block, so that deterioration of the cover of the optical fiber can be prevented.

In addition, Patent Document 2 listed below discloses a laser delivery apparatus emitting light incident on a clad. In the laser delivery apparatus, a portion of the optical fiber in which a portion of the clad is exposed is bent with a predetermined radius of curvature and is covered with a light transmitting member, and a light absorbing member and a cooling member are installed in the light transmitting member. In this configuration, since the clad has an exposed portion, light propagating through the clad can be substantially completely removed.

[Patent Document 1] Japanese Patent Application Laid-Open No. 2008-310277
[Patent Document 2] Japanese Patent Application Laid-Open No. 2010-002608

SUMMARY OF THE INVENTION

Objects To be Achieved by the Invention

As described above, the light incident, from the amplification optical fiber on the delivery fiber includes pumping light propagating through the clad of the amplification optical fiber and signal light propagating through the core. In general, the pumping light has a component having a large NA (Numerical Aperture), and in comparison to the pumping light, the signal light has a component having a relatively small NA. In addition, straightness of the component having a small NA is better than that of the component, having a large NA.

Therefore, according to the fusion splicing structure of the optical fiber disclosed in Patent Document 1, since the optical fiber is arranged in a linear shape, the component, having a small NA is not easily released at the portion covered with the block having high thermal conductivity. Accordingly, when the optical fiber is bent at the portion which is not covered with the block having high thermal conductivity, the component having a small NA is emitted from the clad in this portion, so that the cover layer may be damaged. On the other hand, in the laser delivery apparatus disclosed in Patent Document 2, in the portion in which the optical fiber is bent, the component having a small MA and the component having a large NA of the light are emitted at once to be converted into heat, so that heat releasing sites are concentrated. Therefore, even in the case in which a cooling member is installed, the optical fiber may be damaged by the heat.

The present invention is directed to provide a light delivery component capable of preventing damage caused by heat and a laser system employing the light delivery component.

Means for Achieving the Objects

According to an aspect of the present invention, there is provided a light, delivery component including: a delivery fiber configured to include a core and a clad; and a heat radiating member, wherein the delivery fiber is configured to include a first light emitting unit connected to a portion of the heat radiating member and a second light emitting unit connected to another portion of the heat radiating member, and at least the second light emitting unit is bent, and wherein the first light emitting unit is installed closer to a light incidence end of the delivery fiber than the second light emitting unit, and a bending radius of the first light emitting unit is set to be larger than that of the second light emitting unit.

In the light delivery component, when lights including light having a small NA and light having a large NA are incident on the clad of the delivery fiber, the lights are allowed to sequentially propagate through the first light emitting unit and the second light emitting unit. The light having a large NA has a small incident angle to the clad on the outer peripheral surface of the delivery fiber and is easily emitted from the clad. On the other hand, the light having a small NA has a large incident angle to the clad on the outer peripheral surface of the delivery fiber and is not easily emitted from the clad. Therefore, since the bending radius of the first light emitting unit is larger than that of the second heat radiating member, the light having a relatively large NA in the lights incident on the clad is emitted from the first light emitting unit. In addition, since the bending radius of the second light emitting unit is smaller than that of the first light emitting unit, the light having a relatively large NA as well as the light having a relatively small NA are also emitted. Therefore, the remaining lights passing through the first, light emitting unit are emitted from the second light emitting unit. In addition, heat generated due to the light emitted from the first light emitting unit is released from a portion of the heat radiating member, and heat generated due to the light emitted from the second light emitting unit is released from another portion of the heat radiating member. In this manner, the lights including the light having a relatively large NA and the light having a relatively small NA are emitted from different sites so as for heat to be individually released, so that the heat releasing sites can be prevented from being concentrated. Therefore, the heat releasing sites are distributed, so that heat can be appropriately released. Therefore, it is possible to prevent damage caused by heat.

In addition, it is preferable that the first light emitting unit is arranged in a linear shape.

Since the first light emitting unit is configured to be arranged in a linear shape, the light having a small NA can be allowed to appropriately propagate to the second light emitting unit. Therefore, generated heat can be more appropriately distributed to the first light emitting unit and the second light emitting unit.

In addition, as described above, in the case in which the first light emitting unit is configured to be arranged in a linear shape, the second light emitting unit may be set to have a certain bending radius.

According to the configuration, a portion of the heat radiating member which is to be connected to the second light emitting unit can be easily formed. For example, in general, the heat radiating member is produced by processing aluminum or the like having good thermal conductivity by using a metal processing machine such as a milling machine. Since the second light emitting unit is set to have a certain bending radius, the portion of the heat radiating member connected to the second light emitting unit can be processed with a certain bending radius, so that the heat radiating member can be easily processed. Therefore, it is possible to suppress the cost of the heat radiating member to low cost.

Alternatively, as described above, in the case in which the first light emitting unit is arranged in a linear shape, the bending radius of the second light emitting unit may be set to be gradually decreased from the first light emitting unit side.

In this case, the lights including the light having a relatively large NA through the light having a relatively small NA are sequentially gradually emitted from the second light emitting unit. Therefore, even in the case in which the light having a relatively large NA which is not emitted from the first light emitting unit propagates through the second light emitting unit, the light having a relatively large NA is first emitted from the second light emitting unit, and next, the light having a relatively small NA can be emitted from the second light emitting unit. Accordingly, in the second light emitting unit, the heat releasing sites are further distributed, so that it is possible to more appropriately prevent damage caused by heat, Alternatively, it is preferable that the bending radius of the delivery fiber is set to be gradually decreased over a range from the first light emitting unit to the second light emitting unit.

Since the bending radius of the delivery fiber is set to be gradually decreased, the lights including the light having a relatively large NA through the light having a relatively small NA can be sequentially gradually emitted. Accordingly, the heat releasing sites can be further distributed, so that it is possible to more appropriately prevent damage caused by heat.

In addition, it is preferable that the heat radiating member further includes a light transmitting resin covering the delivery fiber, and the clad is covered with the light transmitting resin in at least a portion of the first light emitting unit and the second light emitting unit.

Since the clad is covered with the light transmitting resin, the light can be converted into heat at the site separated from the delivery fiber. Therefore, the delivery fiber can be more appropriately protected from the heat.

In addition, it is preferable that the delivery fiber further includes a cover layer covering the clad, and the clad is covered with the cover layer in at least a portion of the first light emitting unit, and the second light emitting unit.

Since the clad is covered with the cover layer in at least a portion of the first light emitting unit and the second light emitting unit, it is possible to prevent the core and clad from being damaged by the cover layer when the light delivery component is assembled. Particularly, when the clad is covered with the cover layer in at least a portion of the second light emitting unit which is bent in the portion in which the bending radius of the delivery fiber is small, it is possible to more effectively prevent the core and the clad from being damaged when the light delivery component is assembled.

In addition, it is preferable that, in the case in which the delivery fiber includes a cover layer, the heat radiating member further includes a resin covering the delivery fiber, the cover layer is covered with the resin in at least a portion of the first light emitting unit and the second light emitting unit, and the cover layer and the resin have light-transmitting properties.

Since the cover layer and the resin are light transmitting resins, the heat releasing at the cover layer can be suppressed, and the light can be converted into heat at the site separated from the delivery fiber. Therefore, the delivery fiber can be more appropriately protected from the heat.

Alternatively, it is preferable that, in the case in which the delivery fiber includes a cover layer, the heat radiating member further includes a resin covering the delivery fiber, the cover layer is covered with the resin in at least a portion of the first light emitting unit and the second light emitting unit, and thermal conductivity of the resin is higher than that of the cover layer.

Since the thermal conductivity of the resin covering the cover layer is higher than that of the cover layer, even in the case in which the heat is released at the cover layer, the heat can be appropriately conducted through the resin. Therefore, even in this case, the delivery fiber can be more appropriately protected from the heat.

In addition, according to another aspect of the present invention, there is provided a laser system including: the light delivery component according to any one of the above-disclosed light delivery components; and an optical fiber configured to include a core and a clad to emit light, wherein an emitting end of the optical fiber is connected to the incidence end of the delivery fiber.

In the laser system, even in the case in which a portion of the emitted light emitted from the optical fiber is incident on the clad of the delivery fiber, the light is appropriately emitted. Even in the case in which the emitted light includes light having a large NA and light having a small NA, the heat due to the emission of the light can be distributed. Therefore, it is possible to implement a laser system having high reliability.

In addition, the laser system may further include a pumping light source, and the optical fiber may be an amplification optical fiber in which active elements excited by pumping light emitted from the pumping light source are added to the core.

The laser system is configured with a fiber laser system. In general, the surplus pumping light emitted from the amplification optical fiber is light having a large NA, and the signal light amplified in the amplification optical fiber includes light having a large NA and light having a small NA. Therefore, in the laser system according to the present invention, in the case in which the surplus pumping light emitted from the amplification optical fiber may be incident on the clad of the delivery fiber, or in the case in which a portion of the signal light is incident on the clad, most of the surplus pumping light is emitted from the first light emitting unit, and most of the signal light incident on the clad is emitted from the second light emitting unit. Therefore, since the pumping lights incident on the clad and the signal lights incident on the clad can be dispersed and converted into heat, it is possible to implement a fiber laser system having high reliability.

Alternatively, the laser system may further include a pumping light source and an amplification optical fiber in which active elements excited by the pumping light are added to the core, and the incidence end of the optical fiber may be connected to an emitting end of the amplification optical fiber.

Even in the laser system, in the case in which the surplus pumping light emitted from the amplification optical fiber is incident through the optical fiber on the clad of the delivery fiber or in the case in which a portion of the signal light emitted from the amplification optical fiber through the optical fiber is incident on the clad of the delivery fiber, most of the surplus pumping light is emitted from the first light emitting unit, and most of the signal light incident on the clad is emitted from the second light emitting unit. Therefore, since the pumping lights incident on the clad and the signal lights incident on the clad can be dispersed and converted into heat, it is possible to implement a fiber laser system having high reliability.

Effect of the Invention

According to the present invention, it is possible to provide a light delivery component capable of preventing damage caused by heat and a laser system employing the light, delivery component.

DESCRIPTION OF THE EMBODIMENTS

Hereinafter, light delivery components and laser systems employing the light delivery components according to exemplary embodiments of the present invention will be described in detail with reference to the drawings.

(First Embodiment)

Figure 1:
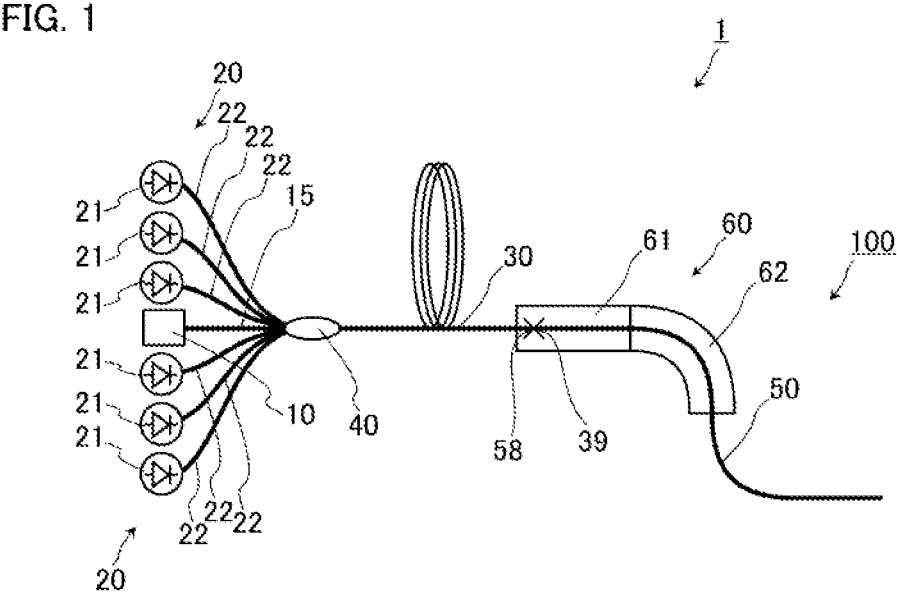
FIG. 1 is a diagram illustrating a laser system according to a first embodiment of the present invention.

FIG. 1 is a diagram illustrating a laser system according to a first embodiment of the present invention.

As illustrated in FIG. 1, the laser system 1 is a fiber laser system configured to mainly include a seed light source 10 which emits seed light, an pumping light source 20 which emits pumping light, an amplification optical fiber 30 on which the seed light and the pumping light are incident, a combiner 40 which connects the seed light source 10 and the pumping light source 20 with the amplification optical fiber 30, a light, delivery component 100 which has a delivery fiber 50 of which one end is connected to the amplification optical fiber 30. The laser system is an MO-PA (Master Oscillator Power Amplifier) type fiber laser system in which the seed light emitted from the seed light source 10 is amplified by an amplification optical fiber to be emitted.

The seed light source 10 is, for example, a laser light source configured with laser diodes or is configured with a Fabry-Perot type laser system or a fiber ring type fiber laser system. The seed light emitted from the seed light source 10 is not particularly limited, but it may be, for example, laser light having a wavelength of 1070 nm. In addition, the seed light source 10 is connected to the seed-light fiber 15 configured to include a core and a clad covering the clad, so that the seed light emitted from the seed light source 10 propagates through the core of the seed-light fiber 15. The seed-light fiber 15 is, for example, a single-mode fiber. In this case, the seed light propagates as a single-mode light through the seed-light fiber 15. In addition, the seed light emitted from the seed light source 10 is also referred to as a signal light. However, it is unnecessary that a signal is particularly superposed on the seed light.

The pumping light source 20 is configured with a plurality of laser diodes 21. As described above, in the case in which the wavelength of the seed light is 1070 nm, the pumping light source 20 emits, for example, pumping light having a wavelength of 915 nm. In addition, each of the laser diodes 21 of the pumping light source 20 is connected to the pumping-light fiber 22, so that the pumping light emitted from the laser diode 21 propagates through the pumping-light fiber 22. The pumping-light fiber 22 is, for example, a multi-mode fiber. In this case, the pumping light propagates as a multi-mode light through the pumping-light fiber 22.

Figure 2:
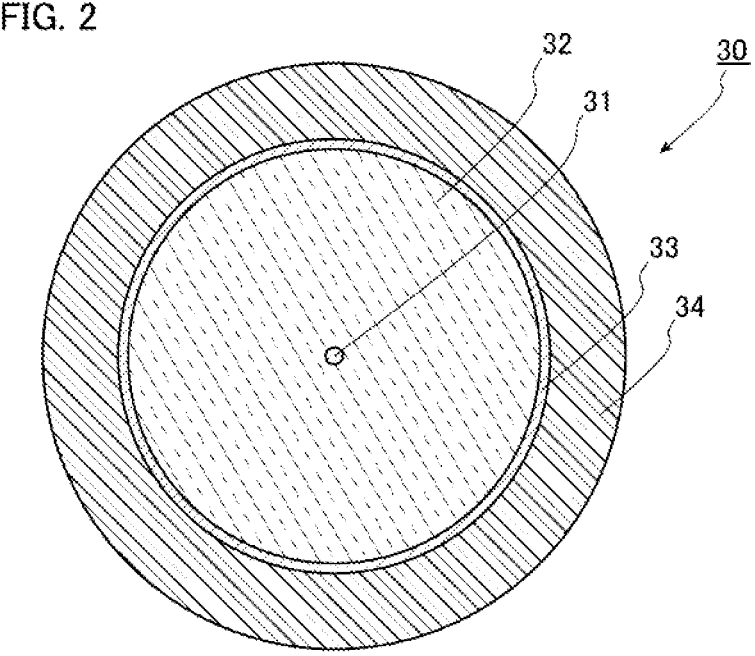
FIG. 2 is a diagram illustrating a structure of a cross section perpendicular to a longitudinal direction of an amplification optical fiber of FIG. 1.

FIG. 2 is a diagram illustrating a structure of a cross section perpendicular to a longitudinal direction of the amplification optical fiber 30. As illustrated in FIG. 2, the amplification optical fiber 30 is configured to include a core 31, a clad 32 covering the core 31, an outer clad 33 covering the clad 32, and a cover layer 34 covering the outer clad 33. The reflective index of the clad 32 is set to be lower than the reflective index of the core 31, and the reflective index of the outer clad 33 is set to be much lower than the reflective index of the clad 32. The diameter of the core 31 is set to, for example, 15 μm, and the outer diameter of the clad 32 is set to, for example, 400 μm. A material constituting the core 31 includes, for example, quartz added with elements such as germanium increasing the refractive index and active elements such as ytterbium (Yd) excited by the pumping light emitted from the pumping light source 20. The active elements include, for example, rare earth elements. As the rare earth elements, there are thulium (Tm), cerium (Ce), neodymium (Nd), europium (Eu), and the like in addition to the above-described Yb. Furthermore, as the active elements, there are bismuth (Bi) or chromium (Cr), and the like in addition to the rare earth elements. In addition, a material forming the clad 32 includes, for example, pure quarts added with no impurity. In addition, a material forming the outer clad 33 includes, for example, a UV curable resin or quartz added with fluorine or the like. In addition, a material forming the cover layer 34 include, for example, a UV curable resin which is different from the resin forming the outer clad 33.

The combiner 40 connects the seed-light fiber 15 and each pumping-light fiber 22 with the amplification optical fiber 30. More specifically, in the combiner 40, the end surface of the core of the seed-light fiber 15 is connected to the end surface of the core 31 of the amplification optical fiber 30. In addition, in the combiner 40, the end surface of the core of each pumping-light fiber 22 is connected to the end surface of the clad 32 in the one end of the amplification optical fiber 30. Therefore, the seed light emitted from the seed light source 10 is incident on the core 31 of the amplification optical fiber 30, and the pumping light emitted from the pumping light source 20 is incident on the clad 32 of the amplification optical fiber 30.

Figure 3:
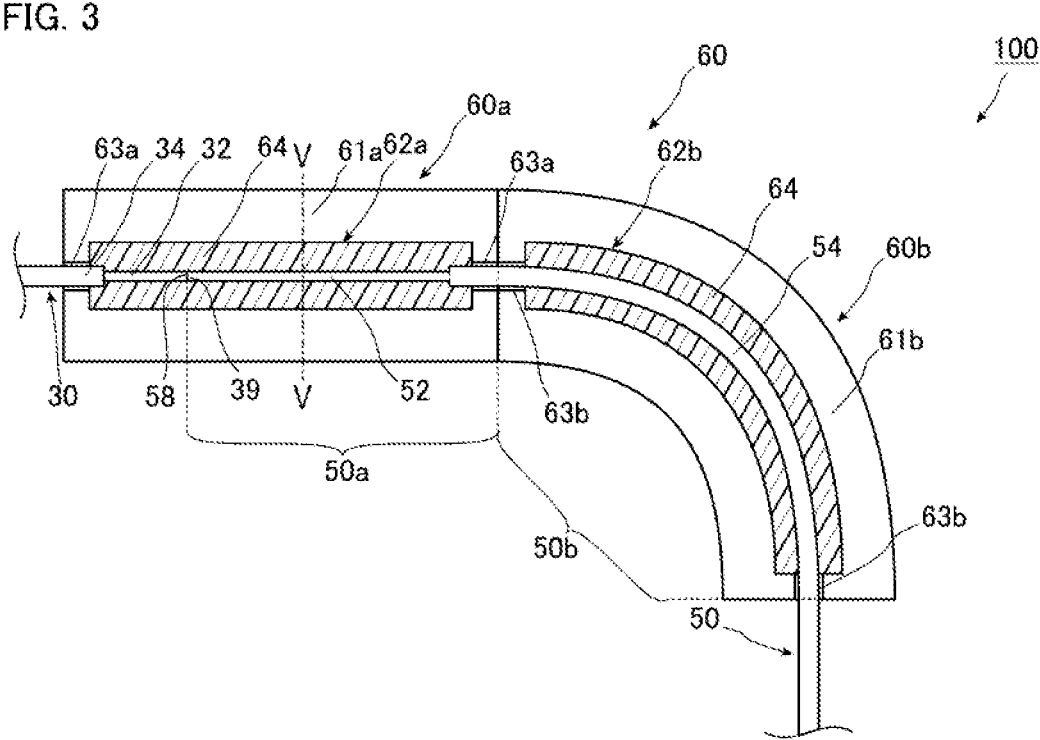
FIG. 3 is an enlarged diagram illustrating a light delivery component of FIG. 1.

FIG. 3 is an enlarged diagram illustrating the light delivery component 100 of FIG. 1. As illustrated in FIG. 3, the light delivery component 100 is configured to include a heat radiating member 60 and a delivery fiber 50.

Figure 4:
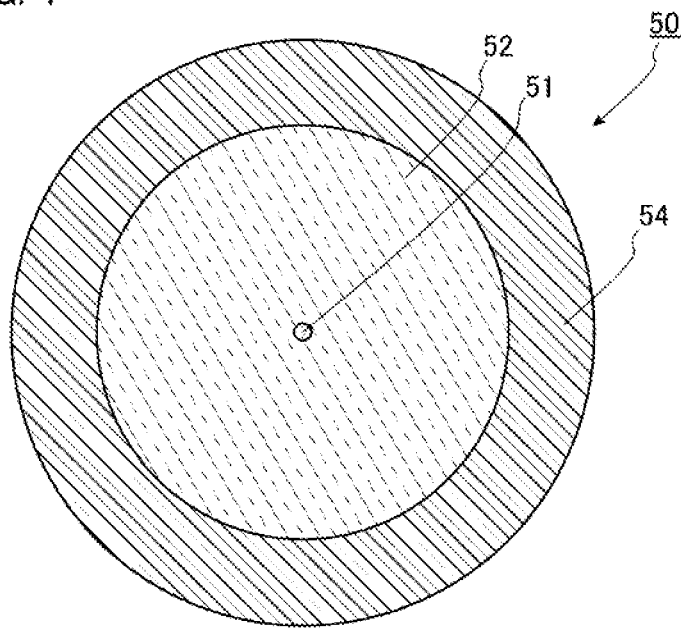
FIG. 4 is a diagram illustrating a structure of a cross section perpendicular to a longitudinal direction of a delivery fiber of FIG. 3.

FIG. 4 is a diagram illustrating a structure of a cross section perpendicular to a longitudinal direction of the delivery fiber 50 of FIG. 3. As illustrated in FIG. 4, the delivery fiber 50 is configured to include a core 51, a clad 52 which covers the core 51, and a cover layer 54 which covers the clad 52. For example, the diameter of the core 51 is set to be equal to that of the core 31 of the amplification optical fiber 30. For example, the outer diameter of the clad 52 is set to be equal to that of the clad 32 of the amplification optical fiber 30. For example, the outer diameter of the cover layer 54 is set to be equal to that of the cover layer 34 of the amplification optical fiber 30. In addition, for example, the reflective index of the core 51 is set to be equal to that, of the core 31 of the amplification optical fiber 30, and the reflective index of the clad 52 is set to be equal to that of the clad 32 of the amplification optical fiber 30. A material forming the core 51 includes, for example, quartz added with an element such as germanium increasing the refractive index. In addition, a material forming the clad 52 includes, for example, pure quartz added with no impurity. In addition, a material forming the cover layer 54 includes, for example, an urethane-based UV curable resin.

As illustrated in FIGS. 1 and 3, in the delivery fiber 50, a predetermined length of the cover layer 54 of the light incidence end 58 side is peeled off, so that the clad 52 is exposed. The light incidence end 58 is connected to the emitting end 39 of the amplification optical fiber 30. In addition, a predetermined length of the delivery fiber 50 from the light incidence end 58 including the portion in which the cover layer 54 is peeled off is set as the first light emitting unit 50a, and a predetermined length of the delivery fiber 50 extended from the incidence end 58 side to the first light emitting unit 50a is set as the second light emitting unit 50b. Therefore, in the embodiment, in a portion of the first light emitting unit 50a, the cover layer 54 is peeled off so that the clad 52 is exposed; and in the other portion thereof, the cover layer 54 is not peeled off. In addition, in the second light emitting unit 50b of the delivery fiber 50, the cover layer 54 is not peeled off. In this manner, in the light delivery component 100 according to the embodiment, since the clad is covered with the cover layer in a portion of the first light emitting unit 50a and the second light emitting unit 50b, it is possible to prevent the core and clad from being damaged by the cover layer 54 when the light delivery component 100 is assembled. In addition, in general, in the portion in which the bending radius of the optical fiber is small, when the cover layer is peeled off, the lifetime of the optical fiber tends to be shortened. However, in this manner, since the clad 52 is covered with the cover layer 54, it is possible to prevent the lifetime of the delivery fiber 50 from being shortened.

The heat radiating member 60 is configured to include a first heat radiating member 60a forming the one portion of the heat radiating member 60 and a second heat radiating member 60b forming the other portion of the heat radiating member 60.

Figure 5:
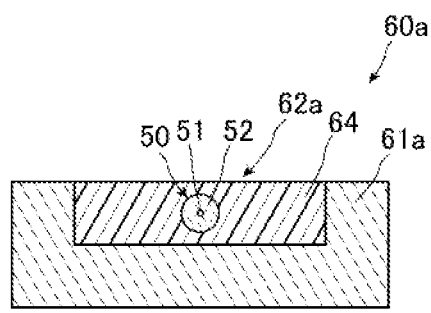
FIG. 5 is a diagram illustrating a structure of a cross section taken along line V-V of FIG. 3.

FIG. 5 is a diagram illustrating a structure of a cross section taken along line V-V of FIG. 3. As illustrated in FIGS. 3 and 5, in the embodiment, the first heat radiating member 60a is configured to include a first base 61a having a plate shape in which a first receiving portion 62a in a concave state is formed and a resin 64 having high thermal conductivity with which the first receiving portion 62a is filled. As the first base 61a is seen from a plan view, the first base 61a has a substantially rectangular shape, and the first receiving portion 62a also has a substantially rectangular shape. In addition, in the first base 61a, a pair of groove portions 63a is formed at two end portions of the first receiving portion 62a in the longitudinal direction so as to be connected to the first receiving portion 62a. A material forming the first base 61a is not particularly limited, but it may be a metal such as aluminum or a ceramic such as aluminum nitride. In addition, the resin 64 is preferably a resin having high thermal conductivity. Although not particularly limited, the resin 64 may include, for example, silicone RTV rubber containing a material having high thermal conductivity.

In addition, the second heat radiating member 60b is configured to include a second base 61b in which a second receiving portion 62b in a concave state is formed and a resin 64 having high thermal conductivity with which the second receiving portion 62b is filled. The shape of the cross section of the second base 61b is configured to be substantially the same as the shape of the cross section of the first base 61a illustrated in FIG. 5, and in the outer shape, the first base 61a is bent at a substantially right angle as seen from a plan view. In addition, in the outer shape of the second receiving portion 62b, the first receiving portion 62a is bent at a substantially right angle as seen from a plan view. In addition, in the second base 61b, a pair of groove portions 63b is formed so as to be connected to the two ends of the second receiving portion 62b. In addition, in the embodiment, although the second base 61b and the second receiving portion 62b are bent at a substantially right, angle in the outer shape thereof, the angle is not particularly limited.

The first light emitting unit 50a of the delivery fiber 50 is arranged in the first heat radiating member 60a in a linear shape, and the connection point of the amplification optical fiber 30 and the delivery fiber 50 is arranged in the first receiving portion 62a of the first heat radiating member 60a. In addition, the portion of the first light emitting unit 50a of the delivery fiber 50 in which the cover layer 54 is peeled off is arranged in the first receiving portion 62a to be covered with the resin 64. In addition, the portion of the first light emitting unit 50a of the delivery fiber 50 in which the cover layer 54 is not peeled off is arranged in the range from the first receiving portion 62a to the groove portion 63a of the second heat radiating member 60b side. Therefore, in the first receiving portion 62a, in the portion of the first light emitting unit 50a in which the cover layer 54 is peeled off, the clad 52 is covered with the resin 64; and in the portion in which the cover layer 54 is not peeled off, the cover layer 54 is covered with the resin 64. In this manner, the first light emitting unit 50a is connected to the first heat radiating member 60a. In addition, it is preferable that, in the first light emitting unit 50a, the thermal conductivity of the resin 64 covering the cover layer 54 is higher than that of the cover layer 54. In this case, even in the case in which heat is released at the cover layer 54, the heat can be appropriately conducted through the resin 64, so that the delivery fiber 50 can be more appropriately protected from the heat. In the case in which the cover layer 54 is an urethane-based resin, the above-described silicone RTV rubber or the like may be used as the resin.

In addition, the amplification optical fiber 30 connected to the delivery fiber 50 is arranged in the groove portion 63a of the side opposite to the groove portion 63a of the side in which the delivery fiber 50 is arranged from the first receiving portion 62a, and the amplification optical fiber 30 is led from the heat radiating member 60.

In addition, the second light emitting unit 50b of the delivery fiber 50 is arranged in the second receiving portion 62b from the groove portion 63b of the first heat radiating member 60a side in the second heat, radiating member 60b and is arranged in the groove portion 63b of the side opposite to the first heat radiating member 60a side from the second receiving portion 62b. Namely, the second light emitting unit 50b of the delivery fiber 50 is arranged so as to be bent along the second base 61b having a shape in which the second base 61b is bent at a substantially right, angle. In addition, in the embodiment, the second light emitting unit 50b is arranged so as to be bent at a substantially right angle with a certain bending radius. In addition, since the cover layer 54 is not peeled off in the second light emitting unit 50b, the cover layer 54 is covered with the resin 64 in the second receiving portion 62b. In this manner, the second light emitting unit 50b is connected to the second heat radiating member 60b. In addition, similarly to the above-described first light emitting unit 50a, it is preferable that, in the second light emitting unit 50b, the thermal conductivity of the resin 64 covering the cover layer 54 is higher than that of the cover layer 54. In this case, even in the case in which the cover layer 54 releases heat, the heat can be appropriately conducted through the resin 64, so that the delivery fiber 50 can be more appropriately protected from the heat. In addition, the portion of the delivery fiber 50 following the second light emitting unit is led to the outside of the heat, radiating member 60. In addition, in the embodiment, as described above, since the first light emitting unit 50a is arranged in a linear shape, the bending radius of the first light emitting unit 50a may be considered to be infinite. Therefore, the bending radius of the first light emitting unit 50a is set to be larger than that of the second light emitting unit 50b. In addition, in the embodiment, the second light emitting unit 50b is bent at a substantially right angle. However, the angle is not particularly limited.

In addition, in the embodiment, the end portion of the delivery fiber 50 of the side opposite to the amplification optical fiber 30 side is set as an emitting end which emits light without connection. However, an end cap constructed with a glass rod for increasing the diameter of the emitted light may be connected to the emitting end.

The operations of the laser system 1 are as follows.

First, the seed light is emitted from the seed light source 10, and the pumping light is emitted front, the pumping light source 20. At. this time, as described above, the wavelength of the seed light emitted from the seed light source 10 is set to, for example, 1070 nm. The seed light emitted from the seed light source 10 propagates through the core of the seed-light fiber 15 to be incident on the combiner 40.

On the other hand, as described above, the wavelength of the pumping light emitted from each of the laser diodes 21 of the pumping light source 20 is set to, for example, 915 nm. The pumping light emitted from each of the laser diodes 21 propagates through the pumping-light fiber 22 to be incident on the combiner 40.

The seed light, incident on the combiner 40 is incident on the core 31 of the amplification optical fiber 30 to propagate through the core 31. On the other hand, the pumping light incident on the combiner 40 is incident on the clad 32 of the amplification optical fiber 30 to mainly propagate through the clad 32.

In the case of the amplification optical fiber 30, in the case in which the pumping light passes through the core 31, the light, is absorbed by the active elements added to the core 31, so that the active elements are excited. The excited active elements generate induced emission. The seed light is amplified due to the induced emission, and the amplified light is emitted as an emitted light from the emitting end 39 of the amplification optical fiber 30.

Next, the emitted light emitted from the core 31 of the amplification optical fiber 30 is incident from the incidence end 58 of the delivery fiber 50 on the core 51 to propagate through the core 51 and is emitted from the emitting end of the delivery fiber 50.

However, as described above, in the case in which the emitted light is incident from the core 31 of the amplification optical fiber 30 on the core 51 of the delivery fiber 50, due to deviation in axis or deviation in angle between the core 31 of the amplification optical fiber 30 and the core 51 of the delivery fiber 50 or due to mismatch in mode field between the amplification optical fiber 30 and the delivery fiber 50 at the incidence end 58, the emitted light may be leaked to be incident as a leaked light on the clad 52. In addition, in the amplification optical fiber 30, the surplus pumping light which is not absorbed by the active elements and is emitted from the emitting end 39 of the amplification optical fiber 30 may be incident on the clad 52 of the delivery fiber 50.

In general, the pumping light includes the light having a relatively large NA, and the emitted light obtained by amplifying the seed light includes the light having a small NA through the light having a large NA. Therefore, as described above, in the case in which the emitted light or the pumping light is incident on the clad 52 of the delivery fiber 50, the light includes the light having a large NA through the light having a small NA.

Since the light having a relatively large NA in the lights incident on the clad 52 has a small incident angle to the outer peripheral surface of the clad 52, the light is easily emitted from the outer peripheral surface of the clad 52. Therefore, at least a portion of the light having a relatively large NA is emitted from the clad 52 in the first light emitting unit 50a of the delivery fiber 50 to be converted into heat. The heat is conducted through the resin 64 in the first heat radiating member 60a to be released through the first base 61a to an external portion. In addition, as described above, when the thermal conductivity of the resin 64 covering the cover layer 54 in the first light emitting unit 50a is higher than that of the cover layer 54, even in the case in which the cover layer 54 in the first light emitting unit 50a releases heat, the heat can be appropriately conducted through the resin 64, so that the delivery fiber 50 can be more appropriately protected from the heat.

On the other hand, since the incident angle of the light having a relatively small NA to the outer peripheral surface of the clad 52 is large, in the first light emitting unit 50a arranged in a linear shape, the light is not easily emitted from the clad 52, and the light passes through the first light emitting unit 50a. In addition, a portion of the light having a relatively large NA also passes through the first light emitting unit 50a. Among the lights propagating through the clad 52, the light passing through the first light emitting unit 50a propagates to the second light emitting unit 50b. However, since the bending radius of the second light emitting unit 50b is smaller than that of the first light emitting unit 50a, the light having a relatively small NA is also easily released from the clad 52. Therefore, among the lights propagating through the clad 52, most of lights reaching the second light emitting unit 50b are emitted from the clad 52 in the second light emitting unit 50b. In addition, in the embodiment, in the second light emitting unit 50b, the clad 52 is covered with the cover layer 54, so that a portion of the light emitted from the clad 52 is converted into heat at the cover layer 54. However, since a portion of the lights incident on the clad 52 is emitted from the first light emitting unit 50a, an amount of the heat released at the cover layer 54 in the second light emitting unit 50b is not large so as to damage the cover layer 54. In addition, in the second light emitting unit 50b, since the cover layer 54 is connected to the second heat radiating member 60b, the cover layer 54 is not easily affected by damage caused by heat. Particularly, as described above, when the thermal conductivity of the resin 64 covering the cover layer 54 in the second light emitting unit 50b is higher than that of the cover layer 54, even in the case in which the cover layer 54 in the second light emitting unit 50b releases heat, the heat can be appropriately conducted through the resin 64, so that the delivery fiber 50 can be more appropriately protected from the heat. Next, the heat generated from the cover layer 54 is conducted through the resin 64 and is released through the second base 61b to an external portion.

As described hereinbefore, in the light delivery component 100 according to the embodiment, when the light including the light having a small NA and the light having a large NA are incident on the clad 52 of the delivery fiber 50, the light sequentially propagates through the first light emitting unit 50a and the second light emitting unit 50b. The light having a large NA such as pumping light has a small incident angle to the outer peripheral surface of the clad 52 of the delivery fiber 50 and is easily emitted from the clad 52. On the other hand, the light having a small NA included in the emitted light obtained by amplifying the seed light has a large incident angle to the outer peripheral surface of the clad 52 of the delivery fiber 50 and is not easily emitted from the clad 52. Therefore, in the light delivery component 100 according to the embodiment, since the bending radius of the first light emitting unit 50a is set to be higher than that of the second light emitting unit 50b, the light having a relatively large NA such as pumping light or a portion of the emitted light in the lights incident on the clad 52 is emitted from the first light emitting unit 50a. In addition, since the bending radius of the second light emitting unit 50b is set to be lower than that of the first light emitting unit 50a, the light having a relatively large NA and the light having a relatively small NA can also be emitted. Therefore, the remaining lights passing through the first light emitting unit 50a are emitted from the second light emitting unit 50b. In addition, the heat generated due to the light emitted from the first light emitting unit 50a is released from the first heat radiating member 60a, and the heat, generated due to the light emitted from the second light emitting unit 50b is released from the second heat radiating member 60b. In this manner, the lights including the light having a relatively large NA and the light having a relatively small NA are emitted from different sites so as for heat to be individually released, so that the heat releasing sites can be prevented from being concentrated. Therefore, the heat releasing sites are distributed, so that heat can be appropriately released. Therefore, it is possible to prevent damage caused by heat.

Therefore, the laser system 1 using the light delivery component 100 can have high reliability. Particularly, like the embodiment, in the case in which the laser system 1 is a fiber laser system using the amplification optical fiber 30, in some cases, the surplus pumping light emitted from the amplification optical fiber 30 may be incident on the clad 52 of the delivery fiber 50, or a portion of the emitted light obtained by amplifying the seed light may be incident, on the clad 52. However, even in these cases, most of the surplus pumping light is emitted from the first light emitting unit 50a, and most of the emitted light incident on the clad 52 is emitted from the second light emitting unit 50b. Therefore, since the pumping lights incident on the clad 52 and the signal lights incident on the clad 52 can be dispersed and converted into heat, it is possible to implement a fiber laser system having high reliability.

In addition, in the light delivery component 100 according to the embodiment, since the first light emitting unit 50a is arranged in a linear shape, the light having a small NA can be allowed to appropriately propagate to the second light emitting unit 50b, so that the generated heat can be more appropriately/ distributed in the first light emitting unit 50a and the second light emitting unit 50b. In addition, since the second light emitting unit 50b is bent with a certain bending radius, the second heat radiating member 60b connected to the second light emitting unit 50b can be processed with constant bending deformation. Particularly, in the case in which the second base 61b is constructed with a metal having good thermal conductivity such as aluminum, since the second base 61b can be easily processed by using a metal processing machine such as a milling machine, the second receiving portion 62b can also be easily formed, so that the heat radiating member 60 can be produced at low cost.

In addition, in the laser system 1 according to the embodiment, a different optical fiber may be installed between the amplification optical fiber 30 and the delivery fiber 50. The optical fiber is configured to include a core and a clad. For example, the optical fiber has the same configuration as the seed-light fiber 15 or is configured with a double-clad fiber including a core, a clad, and an outer clad. In the case in which the optical fiber is a double-clad fiber, the double-clad fiber may have the same configuration as the amplification optical fiber 30 except, that active elements are not added to the core. In this case, the emitting end of the amplification optical fiber 30 is connected to the incidence end of the optical fiber, and the emitting end of the optical fiber is connected to the incidence end of the delivery fiber.

(Second Embodiment)

Figure 6:
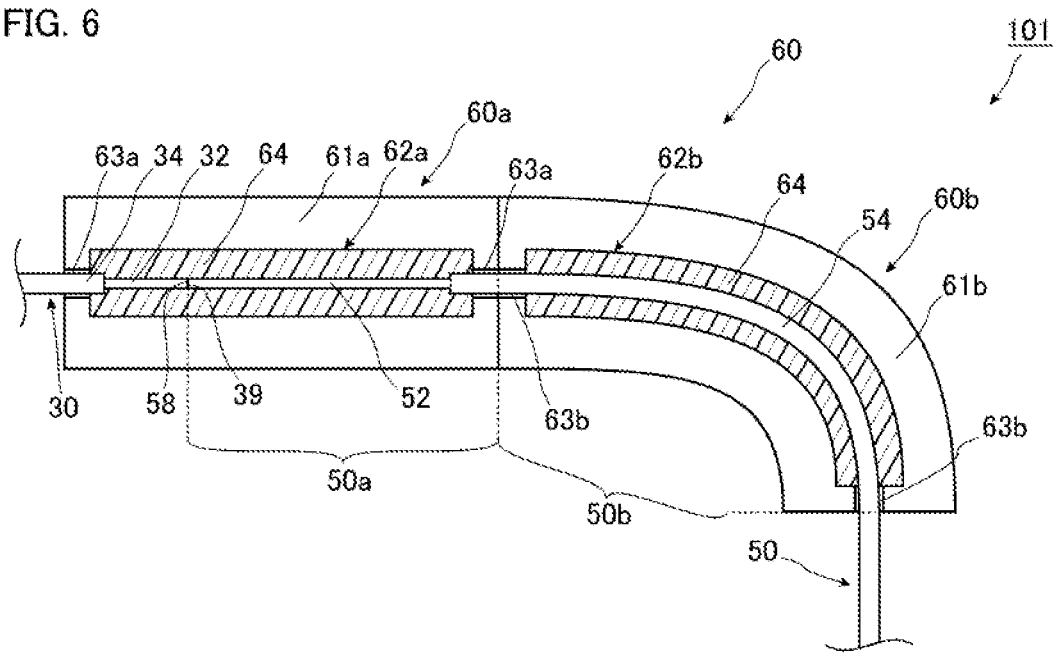
FIG. 6 is an enlarged diagram illustrating a light delivery component according to a second embodiment of the present invent ion.

Next, a second embodiment of the present invention will be described in detail with reference to FIG. 6. The same components as those in the first embodiment or the components equivalent to those in the first embodiment are denoted by the same reference numerals, and the description thereof are not repeated except for the case in which the components are to be particularly described. FIG. 6 is an enlarged diagram illustrating a light delivery component 101 according to the second embodiment of the present invention.

The light delivery component 101 according to the embodiment is the same as the light delivery component 100 according to the first embodiment in that the delivery fiber 50 is arranged in a linear shape in the first light emitting unit 50a, However, the light delivery component 101 according to the embodiment is different from the light delivery component 100 according to the first embodiment in that the delivery fiber 50 is arranged so that, the bending radius of the delivery fiber 50 is gradually decreased from the first light emitting unit, side in the second light emitting unit 50b. In addition, with respect to the outer shapes of the first base 61a and the second base 61b, the first base 61a of the first heat, radiating member 60a and the second base 61b of the second heat radiating member 60b are bent in the plane direction according to the bending of the delivery fiber 50. Accordingly, with respect to the outer shapes of the first receiving portion 62a and the second receiving portion 62b, the first receiving portion 62a and the second receiving portion 62b are bent in the plane direction.

In the light delivery component 101 according to the embodiment, the lights including the light having a relatively large NA through the light having a relatively small NA are sequentially gradually emitted from the second light emitting unit. Therefore, even in the case in which the light having a relatively large NA which is not emitted from the first light emitting unit propagates through the second light emitting unit, the light having a relatively large NA is first emitted from the second light emitting unit, and the light having a relatively small NA is emitted. Accordingly, in the second light emitting unit, the heat releasing sites can foe further distributed in comparison to the light delivery component 100 of the first embodiment, so that it is possible to more appropriately prevent damage caused by heat.

(Third Embodiment)

Figure 7:
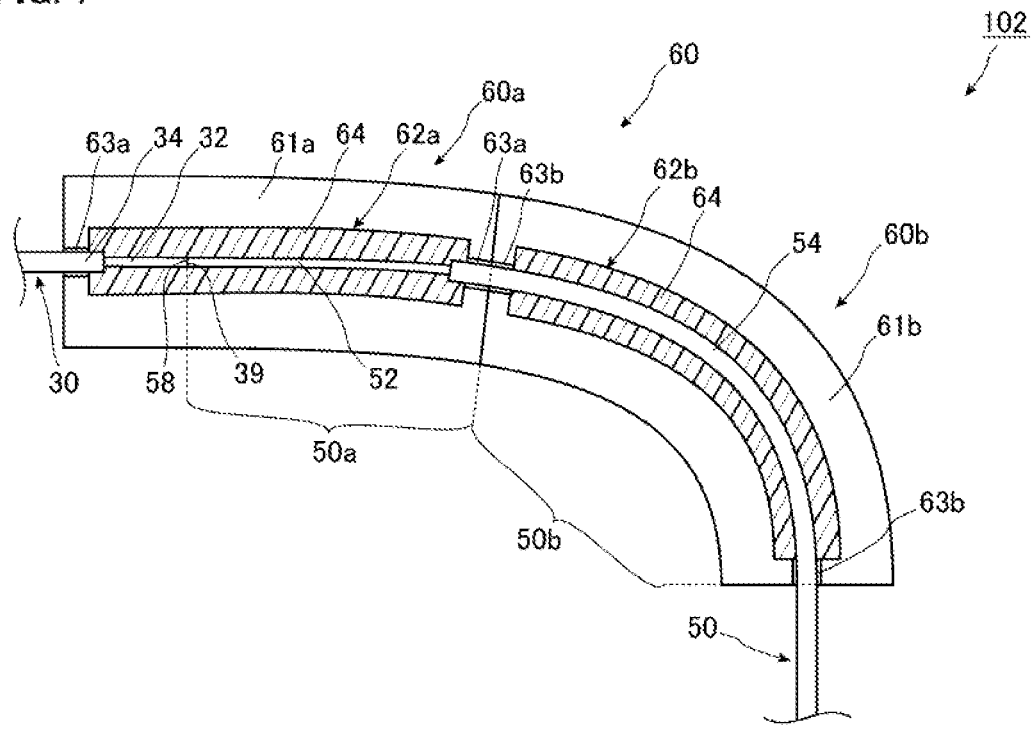
FIG. 7 is an enlarged diagram illustrating a light delivery component according to a third embodiment of the present invention.

Next, a third embodiment of the present invention will be described in detail with reference to FIG. 7. The same components as those in the first embodiment or the components equivalent to those of the first embodiment are denoted by the same reference numerals, and the description thereof are not repeated except for the case in which the components are to be particularly described. FIG. 7 is an enlarged diagram illustrating a light delivery component 102 according to the third embodiment of the present invention.

As illustrated in FIG. 7, the light delivery component. 102 according to the embodiment is configured so that the bending radius of the delivery fiber 50 is gradually decreased over the range from the first light emitting unit 50a to the second light, emitting unit 50b. Therefore, although the delivery fiber 50 in the first light emitting unit 50a is arranged in a linear shape in light delivery component 100 according to the first embodiment, the delivery fiber 50 in the first light emitting unit 50a is arranged to be bent in the light delivery component 102 according to the embodiment. In addition, the outer shape of the first, base 61a of the first heat radiating member 60a and the outer shape of the second base 61b of the second heat radiating member 60b are bent in the plane direction according to the bending of the delivery fiber 50, so that the outer shape of the first receiving portion 62a and the outer shape of the second receiving portion 62b are bent in the plane direction.

In the light delivery component 102 according to the embodiment, since the bending radius of the delivery fiber 50 is gradually decreased over the range from the first light emitting unit 50a to the second light emitting unit 50b, the lights including the light having a relatively large NA through the light, having a relatively small NA can be sequentially gradually emitted. Therefore, the heat releasing sites can be further distributed in comparison to the light delivery component 100 of the first embodiment, so that it is possible to more appropriately prevent damage caused by heat.

(Fourth Embodiment)

Figure 8:
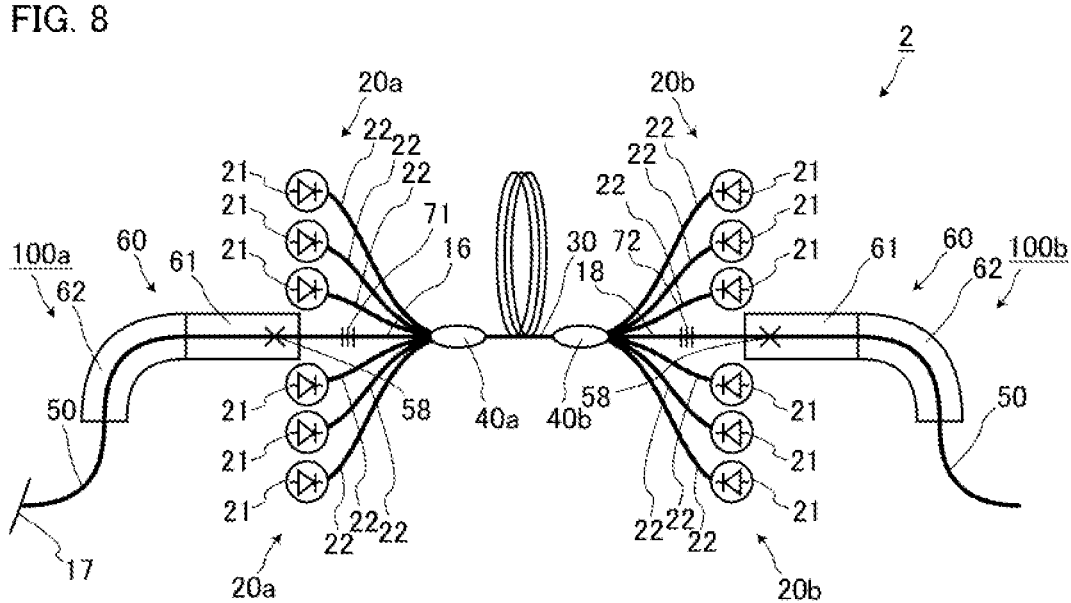
FIG. 8 is a diagram illustrating a laser system according to a fourth embodiment of the present invention.

Next, a fourth embodiment of the present invention will be described in detail with reference to FIG. 8. The same components as in the first embodiment or the components equivalent to the first embodiment are denoted by the same reference numerals, and the description thereof are not repeated except for the case in which the components are to be particularly described. FIG. 8 is a diagram illustrating a laser system 2 according to the embodiment.

As illustrated in FIG. 8, the laser system 2 according to the embodiment is configured to mainly include pumping light sources 20a and 20b having the same configuration as the pumping light source 20 of the first embodiment, an amplification optical fiber 30, combiners 40a and 40b installed at two ends of the amplification optical fiber 30 and having the same configuration as the combiner 40 of the first embodiment, a first resonance fiber 16 connected to the combiner 40a, a light delivery component 100a connected to the first resonance fiber 16 and having the same configuration as the light delivery component 100 of the first embodiment, a second resonance fiber 18 connected to the combiner 40b, a light delivery component 100b connected to the second resonance fiber 18 and having the same configuration as the light delivery component 100 of the first embodiment, a first fiber bragg grating (FBG) 71 as a first mirror installed at the first resonance fiber 16, and a second FBG 72 as a second mirror installed at the second resonance fiber 13.

Similarly to the combiner 40 of the first embodiment, the combiner 40a is installed at the end portion of the amplification optical fiber 30. In addition, the combiner 40b is installed at the end portion of the side opposite to the end portion in which the combiner 40a of the amplification optical fiber 30 is installed.

Similarly to the first embodiment, each of the laser diodes 21 of the pumping light source 20a is connected to the pumping-light fiber 22, and the pumping-light fiber 22 is connected to the clad 32 of the amplification optical fiber 30 in the combiner 40a. Therefore, the pumping light emitted from the pumping light source 20a is incident on the clad 32 of the amplification optical fiber 30 through the combiner 40a.

In addition, the first resonance fiber 16 is configured to include a core and a clad. For example, the first resonance fiber 16 has the same configuration as the seed-light fiber 15 of the first embodiment or is configured with a double-clad fiber including a core, a clad, and an outer clad. In the case in which the first resonance fiber is a double-clad fiber, the double-clad fiber has the same configuration as the amplification optical fiber or has a configuration in which the core is added with no active element. The first resonance fiber 16 is connected to the amplification optical fiber 30 in the combiner 40a, and the core 31 of the amplification optical fiber 30 and the core of the first resonance fiber 16 are coupled with each other. In addition, a first FBG 71 is installed in the core of the first resonance fiber 16, and the first FBG 71 is coupled with the core 31 of the amplification optical fiber 30. The first FBG 71 reflects the light having the same wavelength as that, of a portion of a spontaneous emission light emitted in the case in which the active element added to the core 31 of the amplification optical fiber 30 is in the excited state. The reflectance of the first FBG 71 is set to, for example, 100%. In addition, the incidence end 58 of the delivery fiber 50 in the light delivery component 100a is connected to the side opposite to the amplification optical fiber 30 side of the first resonance fiber 16. In addition, an ending member 17 is connected to the delivery fiber 50 in the light, delivery component 100a.

In addition, similarly to the first embodiment, each of the laser diodes 21 of the pumping light source 20b is connected to the pumping-light fiber 22, and the pumping-light fiber 22 is connected to the clad 32 of the amplification optical fiber 30 in the combiner 40b. Therefore, the pumping light emitted from the pumping light source 20b is incident on the clad 32 of the amplification optical fiber 30 through the combiner 40b.

In addition, the second resonance fiber 13 is configured to include a core and a clad. For example, the second resonance fiber 18 has the same configuration as the seed-light fiber 15 of the first embodiment or is configured with a double-clad fiber including a core, a clad, and an outer clad. In the case in which the second resonance fiber is a double-clad fiber, the double-clad fiber has the same configuration as the amplification optical fiber or has a configuration in which the core is added with no active element. The second resonance fiber 18 is connected to the amplification optical fiber 30 in the combiner 40b, and the core 31 of the amplification optical fiber 30 and the core of the second resonance fiber 18 are coupled with each other. In addition, a second FBG 72 is installed in the core of the second resonance fiber 18, and the second FBG 72 is coupled with the core 31 of the amplification optical fiber 30. The second FBG 72 reflects the light having the same wavelength as light reflected by the first FBG 71 with the reflectance which is lower than that of the first FBG 71. The reflectance of the second FBG is set to, for example, 30%. In addition, the incidence end 58 of the delivery fiber 50 in the light delivery component 100b is connected to the side opposite to the amplification optical fiber 30 side of the second resonance fiber 18.

In this manner, the laser system 2 according to the embodiment is configured as a double-pumping, Fabry-Perot type fiber laser system in which the pumping light is incident from the front side and the rear side of the amplification optical fiber 30 and resonance is performed by the first and second FBGs 71 and 72.

In the laser system 2, first, the pumping light is emitted from each of the laser diodes 21 of the pumping light sources 20a and 20b. Similarly to the laser system 1 according to the first embodiment, the wavelength of the pumping light emitted from each of the laser diodes 21 is set to, for example, 915 nm. The pumping light emitted from each of the laser diodes 21 is incident on the clad 32 from the front side and the rear side of the amplification optical fiber 30 through each of the pumping-light fibers 22. The pumping light incident on the clad of the amplification optical fiber 30 mainly propagates through the clad 32. In addition, in the case in which the light passes through the core 31, the light is absorbed by the active elements added to the core 31, so that the active elements are in the excited state.

Spontaneous emission light is emitted from the active elements which are excited by the pumping light, and optical resonance occurs between the first FBG 71 and the second FBG 72 based on the spontaneous emission light. The resonating light has the same wavelength as reflection wavelength of the first FBG 71 and the second FBG 72, and the resonating light is an amplified light which is amplified by the induced emission of the excited active elements in the amplification optical fiber 30. Next, a portion of the amplified light passes through the second FBG 72 to be emitted as emitted light (signal light) from the second resonance fiber and to be incident on the delivery fiber 50 in the light delivery component 100b. At this time, in the case in which the light is incident from the second resonance fiber on the delivery fiber 50, in some cases, surplus pumping light is emitted from the pumping light source 20a, is not absorbed in the amplification optical fiber 30, and is emitted from the amplification optical fiber 30, or the emitted light is incident on the clad 52 of the delivery fiber 50. However, similarly to the light delivery component 100 according to the first embodiment, the light is converted into heat. Next, the light propagating through the core 51 of the delivery fiber 50 in the light delivery component 100b is emitted from the delivery fiber 50.

In addition, there is a case in which surplus pumping light which is emitted from the pumping light source 20b, is not absorbed in the amplification optical fiber 30, and is emitted from the amplification optical fiber 30 or a portion of a resonating light transmits through the first FBG 71. The light is emitted from the first resonance fiber 16 to be incident on the delivery fiber 50 in the light delivery component 100a. In this case, when the light is incident, from the first resonance fiber 16 on the delivery fiber 50, the light may be incident on the clad 52 of the delivery fiber 50. However, similarly to the light delivery component 100 according to the first embodiment, the light is converted into heat. The light propagating through the core 51 of the delivery fiber 50 in the light delivery component 100a is converted into heat at the ending member 17.

In this manner, in order to allow the light emitted from the amplification optical fiber 30 to be incident on the first and second resonance fibers 16 and 18, in the embodiment, in terms of this point, it may be considered that the two ends of the amplification optical fiber are emitting ends and incidence ends of the first and second resonance fibers 16 and 18 which are optical fibers are connected to the emitting ends of the amplification optical fiber 30. In addition, it may be considered that, in order to allow the light emitted from the amplification optical fiber 30 to propagate, to be emitted, and to be incident on the incidence end of the delivery fiber 50 of the light delivery components 100a and 100b, the first and second resonance fibers 16 and 18 are configured so that the emitting ends of the first and second resonance fibers 16 and 18 are connected to the incidence end 58 of the delivery fiber 50.

In the laser system 2 according to the embodiment, even in the case in which the lights are emitted from the first and second resonance fibers 16 and 18 and are incident on the clad 52 of the delivery fiber 50 of the light delivery components 100a and 100b, the lights are emitted from the first light emitting unit 50a and the second light emitting unit 50b. Therefore, since the lights incident on the clad 52 can be dispersed to be converted into heat, it is possible to configure a laser system having high reliability. Particularly, in a two-side pumping type fiber laser system such as the laser system 2 according to the embodiment, since surplus pumping lights tend to be emitted from two sides of the amplification optical fiber 30, similarly to the laser system 2 according to the embodiment, it is preferable that light delivery components 100a and 100b are arranged at the two side of the amplification optical fiber.

In addition, in the laser system 2 according to the embodiment, the light delivery components 101 and 102 of the second and third embodiments may be used instead of the light delivery components 100a and 100b.

Hereinbefore, the first to fourth embodiments of the present invention have been described. However, the present invention is not limited thereto.

For example, in the above-described embodiments, in a portion of the first light emitting unit 50a, the cover layer 54 is peeled off. However, the peeling off of the cover layer 54 is not an essential configuration. The cover layer 54 may be peeled off in both of the first light emitting unit 50a and the second light emitting unit 50 b, or the cover layer 54 may not be peeled off.

In addition, the cover layer 54 may be configured with a light transmitting resin. In this case, the cover layer 54 may be configured with an urethane-based resin. In this case, at the sites in which the cover layer 54 in the first light emitting unit 50a and the second light emitting unit 50b are not peeled off, since the light propagating through the clad 52 passes through the cover layer 54 to be emitted, the delivery fiber 50 can be appropriately protected for heat releasing at the sites separated from the clad 52.

In addition, the resin 64 may be a light transmitting resin. In this case, in the first light emitting unit 50a and the second light emitting unit 50b, the light emitted from the delivery fiber 50 is converted into heat while propagating through the resin 64, or the light propagates through the resin 64 to be converted into heat at the first base 61a and the second base 61b. In addition, as described above, in the case in which the cover layer 54 is a light transmitting resin, the light which passes through the cover layer 54 is converted into heat, while propagating through the resin 64, or the light propagates through the resin 64 to be converted into heat at the first base 61a and the second base 61b. The light transmitting resin 64 may be an epoxy resin.

In addition, in the above-described embodiments, the laser system is, for example, a fiber laser system. However, the present invention is not limited thereto. For example, a light delivery component used in a solid-state laser system including an optical fiber and emitting light from the optical fiber may be used as the light delivery component of the above-described embodiments.

In addition, in the above-described embodiments, in the laser system 1, the pumping light is incident from the one side of the amplification optical fiber 30; and in laser system 2, the pumping light is incident from the two sides of the amplification optical fiber 30. However, in the laser systems 1 and 2, the pumping light may be incident from any one side or from the two sides of the amplification optical fiber 30.

In addition, in order to further cool the first base 61a and second base 61b, fins for heat sink may be installed in the first base 61a and the second base 61b, and heat pipes may be installed in the first base 61a and the second base 61b.

EXAMPLES

Hereinafter, the present invention will be described in further detail by using Examples and Comparative Examples. However, the present invention is not limited thereto.

Example 1

The same light delivery component as the first embodiment was produced. In the configuration of the laser system of FIG. 1, a delivery fiber which was a single-clad fiber was connected to the emitting end of an amplification optical fiber which was a double-clad fiber, and only about 20 mm of a cover layer from the end portion was peeled off. Next, a first base which was constructed with a metal plate in which a first receiving portion in a concave state was formed and a second base which was constructed with a metal plate in which a second receiving portion in a concave state was formed and which was bent in a planar shape were prepared. Next, the delivery fiber was arranged in a linear shape at the position of about 50 mm from the end portion in the first base, and the receiving portion was filled with the resin having thermal conductivity, so that the outer peripheral surface of the delivery fiber was covered with the resin. In addition, the portion of the delivery fiber which was extended from the portion which was arranged in the first base was arranged in the second base with a certain bending radius of 80 mm and a length of 240 mm, and the receiving portion was filled with the resin having high thermal conductivity, so that the outer peripheral surface of the delivery fiber was covered with the resin.

Next, light of 300 W was incident from the end portion of the delivery fiber. As a result, the temperature of the linearly shaped portion arranged in the first base of the delivery fiber became 68° C; the temperature of the bending starting portion of the portion arranged in the second base became about 80° C; and the temperature of the bending ending portion of the portion arranged in the second base became about 40° C.

Example 2

The same light delivery component as the second embodiment was produced. The configuration of Example 2 was the same as in Example 1 except that the bending radius of the bending starting portion arranged in the second base of the delivery fiber was set to 160 mm and the radius of the bending ending portion was set to 80 mm.

Next, the light having the same intensity as in Example 1 was incident from the end portion of the delivery fiber under the same conditions as in Example 1. As a result, the temperature of the linearly shaped portion arranged in the first base of the delivery fiber became 65° C; the temperature of the bending starting portion of the portion arranged in the second base became about 60° C; and the temperature of the bending ending portion of the portion arranged in the second base became about 60° C.

Comparative Example 1

A delivery fiber was arranged in a first base similarly to Example 1, and a delivery fiber was not arranged in a second base. Other configurations were the same as in Example 1 in production of a light delivery component.

Next, light having about 50 W was incident from an end portion of the delivery fiber under the same conditions as in Example 1. As a result, the temperature of the linearly shaped portion arranged in the first base of the delivery fiber became 60° C; and in the site separated by several tens of centimeters from the end portion of the delivery fiber, the temperature of the portion in which the delivery fiber was bent became about 100° C, so that the cover layer of the delivery fiber was damaged.

Hereinbefore, according to the present invention, the light incident on the clad of the delivery fiber was dispersively emitted, so that the heat releasing sites were distributed. Therefore, it is considered that the light delivery component of the present invention and the laser system employing the light delivery component can prevent damage caused by heat.

INDUSTRIAL APPLICABILITY

As described hereinbefore, according to the present invention, there are provided a light delivery component capable of preventing damage caused by heat and a laser system employing the light delivery component.

DESCRIPTION OF REFERENCE NUMERALS

1, 2 . . . laser system
10 . . . seed light source
15 . . . seed-light fiber 16 ... first resonance fiber
18 ... second resonance fiber
20, 20a, 20b ... pumping light source
21 ... laser diode
22 ... pumping-light fiber
30 ... amplification optical fiber
31 ... core
33 ... resin clad
34 ... cover layer
39 ... emitting end
40, 40a, 40b ... combiner
50 ... delivery fiber
50a ... first light, emitting unit
50b ... second light emitting unit
51 ... core
52 ... clad
54 ... cover layer
60 ... heat radiating member
60a ... first heat radiating member
60b ... second heat radiating member
61a ... first base
61b ... second base
62a ... first receiving portion
62b ... second receiving portion
64 ... resin
71 ... first mirror (first FBG)
72 ... second mirror (second FBG)
100, 100a, 100b, 101, 102 ... light delivery component

The invention claimed is:

1. A light delivery component comprising:
a delivery fiber configured to include a core and a clad; and
a heat radiating member,
wherein the delivery fiber is configured to include a first light emitting unit connected to a portion of the heat radiating member and a second light emitting unit connected to another portion of the heat radiating member, and at least the second light emitting unit is bent,
the first light emitting unit is installed closer to a light incidence end of the delivery fiber than the second light emitting unit, and a bending radius of the first light emitting unit is set to be larger than that of the second light emitting unit,
the delivery fiber further includes a cover layer covering the clad, and
the clad is covered with the cover layer in at least a portion of the first light emitting unit and the second light emitting unit.

2. The light delivery component according to claim 1, wherein the first light emitting unit is arranged in a linear shape.

3. The light delivery component according to claim 2, wherein the second light emitting unit is set to have a constant bending radius.

4. The light delivery component according to claim 2, wherein the bending radius of the second light emitting unit is set to be gradually decreased from the first light emitting unit side.

5. The light delivery component according to claim 1, wherein the bending radius of the delivery fiber is set to be gradually decreased over a range from the first light emitting unit to the second light emitting unit.

6. The light delivery component according to claim 1,
wherein the heat radiating member further includes a light transmitting resin covering the delivery fiber, and
the clad is covered with the light transmitting resin in at least a portion of the first light emitting unit and the second light emitting unit.

7. The light delivery component according to claim 1,
wherein the heat radiating member further includes a resin covering the delivery fiber,
the cover layer is covered with the resin in at least a portion of the first light emitting unit and the second light emitting unit, and
the cover layer and the resin have light-transmitting properties.

8. The light delivery component according to claim 1,
wherein the heat radiating member further includes a resin covering the delivery fiber,
the cover layer is covered with the resin in at least a portion of the first light emitting unit and the second light emitting unit, and
a thermal conductivity of the resin is higher than that of the cover layer.

9. A laser system comprising:
the light delivery component according to claim 1; and
an optical fiber configured to include a core and a clad to emit light,
wherein an emitting end of the optical fiber is connected to the incidence end of the delivery fiber.

10. The laser system according to claim 9, further comprising a pumping light source,
wherein the optical fiber is an amplification optical fiber in which active elements excited by pumping light emitted from the pumping light source are added to the core.

11. The laser system according to claim 9, further comprising:
a pumping light source; and
an amplification optical fiber in which active elements excited by pumping light are added to the core,
wherein the incidence end of the optical fiber is connected to an emitting end of the amplification optical fiber.

* * * * *